United States Patent [19]

Riecke

[11] Patent Number: 4,721,651

[45] Date of Patent: Jan. 26, 1988

[54] MICROCAPSULES HAVING CAPSULE WALLS FORMED OF ALIPHATIC DIISOCYANATE AND DIAMINE

[75] Inventor: Kurt Riecke, Kempen, Fed. Rep. of Germany

[73] Assignee: Feldmuehle Aktiengesellschaft, Dusseldorf, Fed. Rep. of Germany

[21] Appl. No.: 874,551

[22] Filed: Jun. 16, 1986

Related U.S. Application Data

[62] Division of Ser. No. 680,738, Dec. 12, 1984, Pat. No. 4,622,267.

[30] Foreign Application Priority Data

Dec. 23, 1983 [DE] Fed. Rep. of Germany ....... 3346601

[51] Int. Cl.$^4$ .................. B01J 13/02; B32B 27/14; B32B 27/40
[52] U.S. Cl. .................. 428/402.21; 106/21; 264/4.7; 503/213
[58] Field of Search .................. 428/402.21; 264/4.7; 346/213

[56] References Cited

U.S. PATENT DOCUMENTS

| | | | |
|---|---|---|---|
| 3,886,085 | 5/1975 | Kiritani et al. | 428/402.21 |
| 3,968,301 | 7/1976 | Sears | 346/213 X |
| 4,275,905 | 6/1981 | Miller | 264/4.7 X |
| 4,299,723 | 11/1981 | Dahm et al. | 428/402.21 |
| 4,406,816 | 9/1983 | Sliwka | 264/4.7 X |

OTHER PUBLICATIONS

*Hackh's Chemical Dictionary*, Fourth Edition, completely revised and edited by Julius Grant, McGraw-Hill Book Co., 1969, p. 98.

*Primary Examiner*—Richard D. Lovering
*Attorney, Agent, or Firm*—Felfe & Lynch

[57] ABSTRACT

In microcapsules of the type used for pressure-sensitive, carbonless copy papers, having walls formed from aliphatic diisocyanate and diamine and containing a solvent mixture with a dye precursor dissolved therein, the solvent mixture containing a component which easily dissolves the dye precursor and the capsule wall material and a component which only poorly dissolves the dye precursor and the capsule wall, the improvement comprising the poorly dissolving solvent component is an alkylbenzene having from 8 up to 14 C-atoms in the alkyl moiety; and the easily dissolving solvent component is selected from the group consisting of diisopropyl naphthalene, a hydrogenated terphenyl, an alkylated diphenyl, a diphenyl alkane, a chloroparaffin and a mixture thereof, the ratio of easily to poorly dissolving components ranging form 15:85 to 75:25 vol %, and being adjusted within this range so that a solution of the wall-forming aliphatic diisocyanate is just at the turbidity point in the mixture of easily dissolving and poorly dissolving components.

3 Claims, No Drawings

MICROCAPSULES HAVING CAPSULE WALLS FORMED OF ALIPHATIC DIISOCYANATE AND DIAMINE

This is a divisional application of U.S. Ser. No. 680,738, filed Dec. 12, 1984, now U.S. Pat. No. 4,622,267.

The invention related to microcapsules which are produced by means of interfacial-surface addition from aliphatic diisocyanate and diamine, as used for the preparation of pressure-sensitive, carbon-less copy papers.

Pressure-sensitive, carbon-less copy papers have been known for many years and are described, for example, in U.S. Pat. No. 4,299,723. A manifold form of pressure-sensitive, carbonless copy papers generally consists of two or more sheets of paper lying loosely on one another, each upper sheet containing a donor coating on its reverse side and a receptor coating on its upper side. However, pressure-sensitive, carbon-less copy papers have become known in which the receptor and donor coatings are disposed one on the other on one side, or else the donor and receptor coatings are combined in a single coating on the upper side. These papers are also called "self-contained" papers.

The donor coating is formed by microcapsules whose core material contains a color former in an organic solvent or solvent mixture. The acceptor coating contains a material which develops the color former to the visible coloring material. If a manifold form of pressure-sensitive, carbon-less copy papers is written upon, the microcapsules are burst by the high pressure of the writing instrument and the emerging core material strikes the acceptor coating adjacent the microcapsules, causing a visible copy to develop. The acceptor coating is generally made up of a binding agent, an electron-absorbing acid substance, and pigments, the pigments themselves being able to constitute the electron-receiving acid substance, such as, for example, kaolin, attapulgite, montmorillonite, bentonite, and acid bleaching earth. However, phenolic resins, or solid organic acids, can also be used as acid substances.

The quality and usefulness of a pressure-sensitive, carbon-less copy paper is also substantially determined by the microcapsules that are used, particularly as regards sensitivity to contamination and shelf-life. Observations have shown that the shelf-life of a carbon-less, pressure-sensitive copy paper coated with microcapsules depends on the one hand on the boiling point or rate of evaporation of the solvent or solvent mixture, and on the other hand on the permeability of the capsule wall. Likewise, certain irritation phenomena often laid to pressure-sensitive, carbonless copy papers might be linked to the rate of evaporation of the solvent and to the permeability of the capsule wall.

U.S. Pat. No. 4,299,723 has already attempted to provide a satisfactory microcapsule. It describes a microcapsule which contains a solution of a color former. The color former is dissolved in an organic solvent mixture and is encapsulated in the polyaddition product of an aliphatic diisocyanate and a polyamine. A mixture of alkyl naphthalene and an isoparaffin of 10 to 20 carbon atoms is used as the solvent mixture for the color former. After they are formed, the microcapsules are tempered for at least 2 hours at 60° to 70° C. in order to complete the reaction between aliphatic diisocyanate and polyamine. In the reaction of the method of U.S. Pat. No. 4,299,723, however, it has been found in practice that this process and the microcapsules made thereby suffer a number of disadvantages. On the one hand the proposed alkyl naphthalene especially dissoprppylnaphthalene, is not available in sufficient quantity or it is difficult to procure, and on the other hand the isoparaffin has a relatively great rate of evaporation, which has a disadvantageous effect on the shelf life of the capsules.

It is the object of the present invention to improve microcapsules of the kind described above, whose capsule wall material consists of diisocyanate and diamine, with regard to the permeability of their walls and their shelf life, using a solvent mixture of sufficiently available and economic solvent components.

THE INVENTION

This object is achieved in microcapsules of the kind described above by the distinctive features of claim 1.

It has surprisingly been found that impermeable microcapsules of long shelf-life are obtained only if the solvent mixture for the color former and the aliphatic diisocyanate is adjusted such that the turbidity point of the aliphatic diisocyanate is barely reached. The term, "turbidity point," is to be understood to refer to the first turbidity, measurable by means of a nephelometer, which occurs when the necessary amount of the poorly-dissolving solvent is added to the solution of the aliphatic diisocyanate in the solvent that easily dissolves the aliphatic diisocyanate.

An exact explanation of the surprising effect cannot be given. It may be assumed, however, that, when the capsule wall is formed on the basis of the interfacial-surface addition reaction between aliphatic diisocyanate and the added polyamine, the diisocyanate has a tendency, on account of the poor dissolving properties of the solvent mixture, to pass out of the mixture to the interfacial-surface and there to react with the polyamine that is in the surrounding aqueous phase. It is known from U.S. Pat. No. 4,299,723 that, for a barely sufficient capsule wall formation, at least 15 wt.-% of aliphatic diisocyanate is necessary as the capsule wall forming component. At the same time, nothing is said about the adjustment of the solvent mixture in accordance with the invention, and it must therefore be assumed that the aliphatic diisocyanate separates from the solution and contributes to the wall formation more slowly or more incompletely, and the deficient impermeability is the result. Now, if 15 wt.-% of aliphatic diisocyanate is likewise used as the wall forming component in the solvent mixture of the invention, microcapsules of substantially improved wall impermeability and shelf life are obtained on the basis of the processes described above.

The solvent isoparaffin used in U.S. Pat. No. 4,299,723 is an extremely poor dissolver of the aliphatic diisocyanate and the color former. It has now been found that the percentage of the good solvent for the aliphatic diisocyanate can be considerably reduced if the poor solvent sufficiently dissolves the color former and at the same time is a poor to moderate dissolver for the aliphatic diisocyanate. In accordance with the invention, a solvent mixture is used, whose ratio of admixture of easily and poorly dissolving components ranges from 15:85 to 75:25 percent by volume. Thus it is possible to reduce the percentage of the insufficiently available and uneconomical alkyl naphthalenes.

A solvent that poorly dissolves the aliphatic diisocyanate should, however, fulfill the following conditions:

The development of the color image must not be impaired. The viscosity is to be low. The solvent is to have no odor. The boiling point must be as high as possible. The rate of evaporation must be as low as possible. The solvent must be nontoxic. It is to have a sufficient dissolving power for the color former. Its solidifying point is to be as low as possible. It must be insoluble in water and dilutable with good solvents for the aliphatic diisocyanates. Furthermore it is to be economical and sufficiently available.

It has already been proposed to use expensive vegetable oils, such as sunflower oil, for example. However, such oils are too viscous for the intended purpose, they dissolve the color former and the aliphatic diisocyanate poorly, and they interfere with the color development on the color receptor coating.

It has now been found that alkyl benzenes having from 8 up to 14 C-atoms satisfactorily fulfill the above conditions. Especially suitable are the n-alkyl benzenes. Quite especially preferred is n-dodecylbenene as the poorly-dissolving solvent for the aliphatic diisocyanate, since it is sufficiently available, has a low vapor pressure, is toxicologically unobjectionable, and is also economical.

Good solvents for the aliphatic diisocyanate are diisopropylnaphthalene, hydrogenated terphenyl, alkylated biphenyl, diphenylalkane, or especially chloroparaffin, individually or in mixture in the solvent mixture. The ratio of the poor solvent to the good one is governed by the dissolving properties of the good solvent for the aliphatic diisocyanate. Very suitable are chloroparaffins, especially those of a cut of $n-C_{14}$ to $n-C_{17}$ with a chlorine content of approximately 45% of chlorine. Quite especially preferred is a stabilized chloroparaffin like the one described in German Federal publication OS No. 27 02 027.

The invention will be further explained with the aid of the following examples, although the invention is not restricted to these examples.

The production of microcapsules is performed by the method described in U.S. Pat. No. 4,299,723. The aliphatic diisocyanate and the desired color former are first dissolved in the good solvent and the amount of the poor solvent is added which is determined to be necessary for the attainment of the turbidity point. This organic phase is emulsified in an aqueous phase which also contains protective colloids. To this emulsion an aqueous polyamine solution is then added in a stoichiometric amount. Polyvinyl alcohol, for example, can be used as the protective colloid. The microcapsules can basically be made continuously or discontinuously. For this purpose, dispersing apparatus are used which produce a high shear, such as for example high-speed blade or whisk stirrers, colloid mills, ultrasonic dispersers, nozzles, jet nozzles or Supraton machines. The desired size of the microcapsule is predetermined by the applied shear gradient. The microcapsules prepared in this manner do not agglomerate and they have a narrow range of particle sizes. The microcapsule suspensions obtained generally contain from 10 to 40% of capsules, by weight. For the production of pressure-sensitive, carbon-less copy papers, binding agents and, if necessary, inert fillers as well as spacing agents are admixed with the microcapsule suspensions and these dispersions are applied to support papers in accordance with German Federal publications Nos. OS 19 34 457 or 19 55 542. The papers thus coated contain the first color forming component and they are called the donor component.

For the production of copies, the support papers coated with the donor component are brought in contact with additional support papers which are coated with an acceptor coating, as described also, for example, in German Federal publications Nos. OS 19 34 457 and 19 55 542.

EXAMPLE 1

16 g of color former is dissolved in 135.6 ml of diisopropyl naphthalene, with stirring and heating up to a maximum of 90° C. The solution is cooled to about 40° C. and 37.77 ml of oxadiazine diisocyanate is added, with stirring. Then, with stirring, n-dodecylbenzene is added to this solution until the turbidity point is reached. For this purpose precisely 125.2 ml of n-dodecylbenzene is required. This organic phase is added to 597.2 ml of 0.58% aqueous polyvinyl alcohol solution and emulsified with a high-speed stirrer, achieving a droplet size of 7 microns. To this emulsion there is added, with stirring, an approximately 6-percent amine solution consisting of 8 g of diethylene triamine in 124.6 ml of desalted water. This amount of polyamine is determined to be stoichiometric with the diisocyanate. The addition is performed at about 38° C. The suspension continues to be stirred for 30 minutes at about 38° C., and then it is heated to 60° C. over a period of 80 to 90 minutes and stirring is continued for 150 minutes at 60° C. The microcapsule suspension thus obtained contains about 30 weight-percent of microcapsules of an average particle size of 7 microns.

EXAMPLE 2

16 g of color former and 82.3 ml of n-dodecylbenzene are dissolved in 96.48 ml of a stabilized chloroparaffin consisting of a cut of $n-C_{14}$ - $n-C_{17}$ with a chlorine content of 45%, and 82.3 ml of n-dodecylbenzene, with stirring, at a temperature not exceeding 98° C. The solution is cooled to 40° C. and 35.78 ml of oxadiazintrione diisocyanate is dissolved, with stirring, in the system. Again, 82 ml of n-dodecylbenzene is added, with stirring, to the clear solution, such that the turbidity point for the oxadiazintrione diisocyanate is reached. This organic phase is then emulsified in 597.2 ml of an 0.58% polyvinyl alcohol solution with a high-speed stirrer, so that an average particle size of 7 microns is reached. This emulsion is cooled to 25° to 28° C. and, at this temperature, with stirring, a 6% amine solution, consisting of 8 g of diethylenetriamine in 124.6 ml of desalted water, is added. The amount of the polyamine is reckoned as stoichiometric with the diisocyanate. The suspension continues to be stirred for 30 minutes at 25 to 30° C., and then it is heated in 180 minutes to 60° C. and stirring is continued for 150 minutes at 60° C. The microcapsule suspension thus obtained contains 31.2 weight-percent of microcapsules of an average particle size of 7 microns.

EXAMPLE FOR PURPOSES OF COMPARISON 16 g of color former is dissolved in 200 ml of diisopropyl naphthalene by heating not over 90° C., with stirring, and to this clear solution, after cooling to 40° C., 37.77 ml of oxadiazintrione diisocyanate is added, with stirring, and then 60.8 ml of isohexadecane is added. The turbidity point is not reached. The organic phase is added to 597.2 ml of 0.5% aqueous polyvinyl alcohol solution and emulsified with a high-speed stirrer, achieving a droplet size of 7 microns. To this emulsion is added, with stirring, a 6% amine solution consisting of 8 g of diethylenetriamine in 124.6 ml of desalted water. The polyamine is reckoned as stoichiometric with the diisocyanate. The addition of amine is performed at about 38° C. The suspension continues to be stirred for 30 minutes at about 38° C., and then it is heated to 60° C. over a period of 180 minutes and stirring is continued for 150 minutes at 60° C. The microcapsule suspension thus obtained contains 30 wt.-% of microcapsules of an average particle size of 7 microns.

The microcapsules obtained in accordance with Examples 1 and 2 and by the example given for comparison are tested for resistance to aging and for impermeability. Resistance to aging gives an indication of their usability in relation to the length of time they are stored by the end-user. The permeability of the microcapsule is an indication of the soiling tendency of the pressure-sensitive, carbon-less copy papers coated with these microcapsules. The testing of the aging resistance of the capsules is performed as follows: A support paper is coated with a predetermined amount of the microcapsules; then the coated page is placed in contact with the acceptor coating of a second copy paper and a large-area impression is produced. The large-area colored impression that develops on the receptor coating is measured by means of a reflectivity measuring apparatus and the loss of reflection in comparison with the written paper is determined. Four additional samples of the paper coated with capsules are heated in a climatic chamber at 70° C. and 75% relative humidity for a period of 3, 6, 12 and 18 days. After each storage period the production of an impression is repeated, and again a reflectivity measurement is performed. The reflectivity values are compared with the originally measured, so-called "blank" sample, and the so-called "intensity loss" is stated as a percentage.

For the determination of the impermeability of the microcapsules the procedure was as follows: 6.66 g of a 30% capsule suspension is mixed with 10.83 ml of demineralized water and then carefully mixed with 10 g of an extremely fine, alkalinely stabilized aqueous dispersion of silica. A sheet of support paper is stretched smoothly on a flat-ground glass plate and then the mixture is applied by means of a 30-micron Erickson spreader. The coated sheet is immediately dried carefully for 3 minutes in an air stream at 40° to 60° C. Then the reflectivity of the uncoated sheet and that of the coated sheet are measured by means of an electrical reflectivity measuring apparatus. The difference in the reflectivity values indicates the intensity of color of the applied coating. The coated sheet is stored in a climatic oven for 1, 2 and 4 hours at 70° C. and 75% relative humidity, and the reflectivity of the uncoated sheet and of the coated sheet is measured at the stated times. The less the increase in the intensity is, the better is the impermeability of the capsule wall.

The results of the tests for resistance to aging and for the impermeability of the microcapsules are represented in the following examples:

| Example | 1 | 2 | Example for comparison |
|---|---|---|---|
| Color former | 16 g | 16 g | 16 g |
| aliph. diisocyanate | 37.77 ml | 35.78 ml | 37.77 ml |
| dissopropylnaphthalene | 135.6 ml | — | 200.0 ml |

-continued

| Example | 1 | 2 | Example for comparison |
|---|---|---|---|
| isohexadecane | — | — | 60.8 ml |
| n-dodecylbenzene | 125.2 ml | 164.3 ml | — |
| chloroparaffin | — | 96.5 ml | — |
| Test for impermeability of the wall - Intensity | | | |
| 0 h | 0.2 | 0.2 | 0.9 |
| 1 h | 1.1 | 0.7 | 1.4 |
| 2 h | 1.5 | 1.0 | 2.2 |
| 4 h | 1.7 | 1.4 | 2.7 |
| Resistance to aging - Intensity loss | | | |
| 3 d | 4.8% | 5.4% | 14.6% |
| 6 d | 9.5% | 7.3% | 19.7% |
| 12 d | 23.8% | 9.9% | 27.4% |
| 18 d | 35.7% | 29.7% | 48.7% |

The quality of the microcapsule of the invention, which contains n-dodecylbenzene as the poorly dissolving solvent, is decidedly improved. If, instead of the easily-dissolving solvent dissopropylnaphthalene, chloroparaffin is used which consists of the n-$C_{14}$ to n-$C_{17}$ cut containing 45% chlorine, the content of the poorly-dissolving solvent n-dodecylbenzene can even be raised from 48% by volume to 63% by volume of the solvent mixture. In comparison with the standard example, the necessary content of dissopropylnaphthalene was able to be reduced from originally 77 volume-% to 52 volume-%, in Example 1, and in Example 2 the easily-dissolving solvent was replaced entirely by the chloroparaffin, while it was possible to achieve a still further improvement of the quality of the microcapsules of the invention. As shown especially by Example 2, the aliphatic diisocyanate content can also be reduced by 6%, with respect to the original amount of diisocyanate, without thereby impairing the capsule quality; in fact the capsule of Example 2 has the best shelf life and wall impermeability.

It will be understood that the specification and examples are illustrative but not limitative of the present invention and that other embodiments within the spirit and scope of the invention will suggest themselves to those skilled in the art.

What is claimed is:

1. In microcapsules of the type used for pressure-sensitive carbonless copy papers, having walls formed from aliphatic diisocyanate and diamine and containing a solvent mixture with a dye precursor dissolved therein, the solvent comprising a component which easily dissolves the dye precursor and the aliphatic diisocyanate and a component which only poorly dissolves the dye precursor and the aliphatic diisocyanate, the improvement comprising:
    the poorly dissolving component being an alkylbenzene having from 8 to 14 carbon atoms in the alkyl moiety;
    the easily dissolving component being diisopropylnaphthalene; and
    the ratio of easily dissolving component to poorly dissolving component ranging from 15:85 to 75:25 vol. %, and being adjusted within this range so that a solution of the wall-forming aliphatic diisocyanate is just at the turbidity point in the mixture of easily dissolving and poorly dissolving components.

2. The microcapsules of claim 1, wherein the poorly dissolving solvent component is n-alkyl benzene.

3. The microcapsules of claim 2, wherein the poorly dissolving solvent component is n-dodecylbenzene.

* * * * *